Figure 6:

(No Model.)  2 Sheets—Sheet 1.
R. EICKEMEYER.
DYNAMO ELECTRIC AND ELECTRO MAGNETIC MACHINE.
No. 342,587. Patented May 25, 1886.
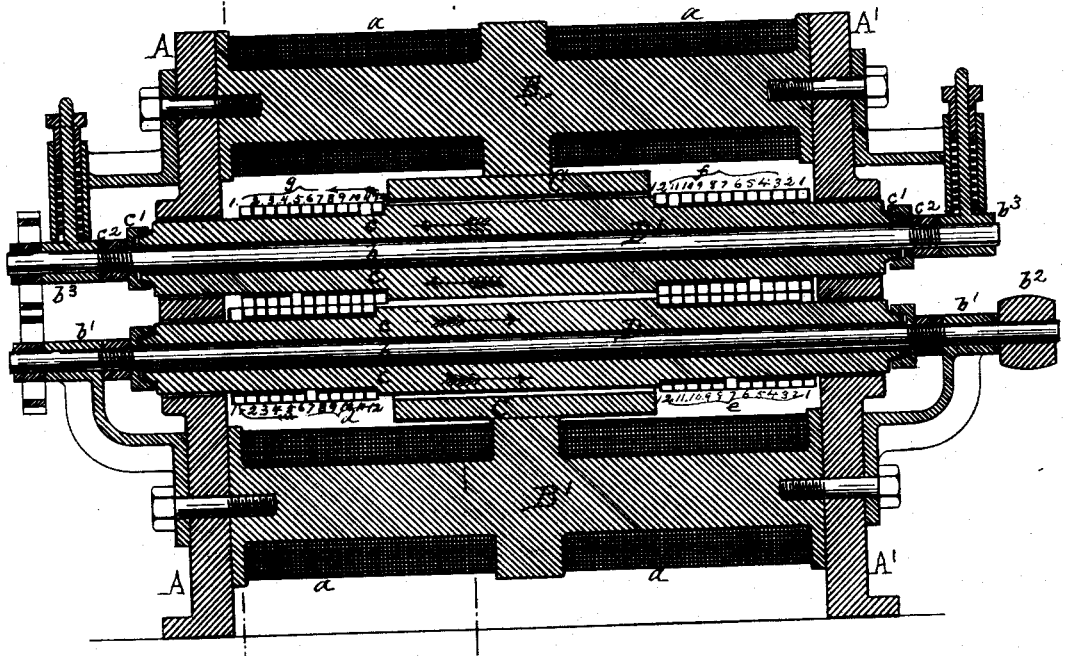
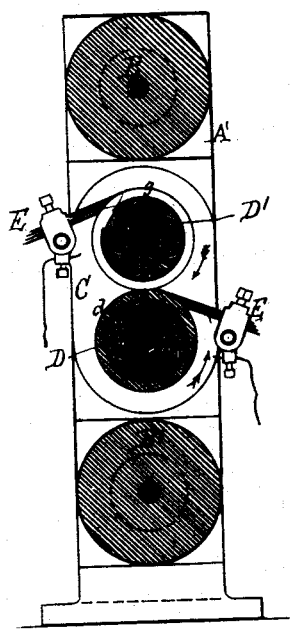
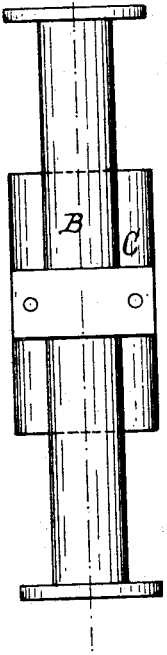
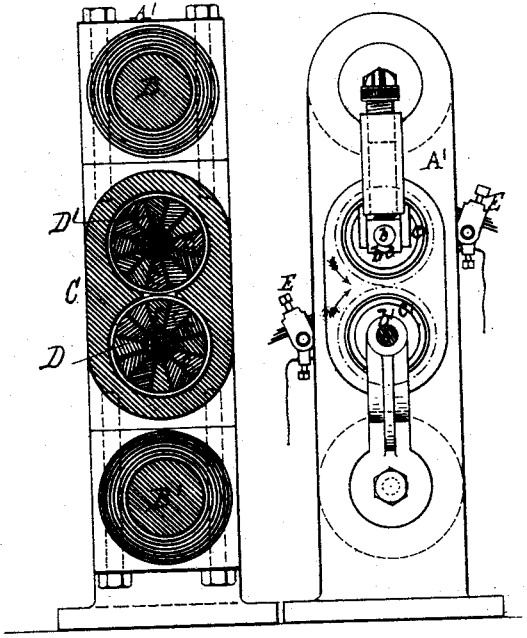
ATTEST:
Philip F. Larner
Howell J. Battle
INVENTOR:
Rudolf Eickemeyer
By McLeod
Attorney.
N. PETERS, Photo-Lithographer, Washington, D. C.

(No Model.) 2 Sheets—Sheet 2.
R. EICKEMEYER.
DYNAMO ELECTRIC AND ELECTRO MAGNETIC MACHINE.
No. 342,587. Patented May 25, 1886.

Attest:
Philip F. Larner.
Howell Butler

Inventor:
Rudolf Eickemeyer.
By _____ Attorney.

UNITED STATES PATENT OFFICE.

RUDOLF EICKEMEYER, OF YONKERS, NEW YORK.

DYNAMO-ELECTRIC AND ELECTRO-MAGNETIC MACHINE.

SPECIFICATION forming part of Letters Patent No. 342,587, dated May 25, 1886.

Application filed December 8, 1882. Serial No. 78,739. (No model.)

*To all whom it may concern:*

Be it known that I, RUDOLF EICKEMEYER, of Yonkers, in the county of Westchester and State of New York, have invented certain new and useful Improvements in Dynamo-Electric and Electro-Magnetic Machines; and I do hereby declare that the following specification, taken in connection with the drawings furnished and forming a part thereof, is a clear, true, and complete description of my invention.

In an application for Letters Patent, Serial No. 76,234, filed by me, November 8, 1882, I have shown and described certain improvements in this class of machines which are in part embodied in the mechanism hereinafter described.

My said prior improvements relate to what are termed "unipolar" machines, and, as heretofore devised by me, my machines involve the employment, with electro-magnets, of a series of rotating conductors or a rotating compound magnet composed of bars which serve as conductors, said bars or conductors being connected in linear series by means of external stationary conductors. In accordance with my present invention, said rotating conductors are employed in a unipolar machine; but I have so devised said conductors, whether they are bars of a compound magnet or simple conductors, that no stationary conductors are requisite for obtaining a linear connection of the series of conductors, although stationary conductors may, if desired, be employed in connection with certain features of my present invention.

After a full description of an illustrated machine and of certain modifications in the construction and arrangement of the parts thereof, the whole being in accordance with my present invention, the features deemed novel will be specified in detail in the several clauses of claim hereunto annexed.

Referring to the drawings, Figure 1 is a longitudinal central vertical section of one of my machines. Fig. 2 is a vertical cross-section of the same on line $x$, Fig. 1, as viewed from the left hand to the right. Fig. 3 is a vertical cross-section of the same at line $y$, Fig. 1. Fig. 4 is a top view of the electro-magnets and pole-piece which afford the field of force. Fig. 5 is an end view of the machine with the driving-pulley removed. Figs. 6 to 11, inclusive, Sheet 2, illustrate variations in construction, which will be specifically referred to.

In the machine shown the field-magnets serve as the frame of the machine. The two vertical end plates or standards, A and A', serve as heads or bars for connecting the two cores B and B', each having its pair of exciting-helices $a$, said cores also serving as longitudinal braces between the standards. As in my prior machines, the four helices are so wound as to develop a central consequent pole in the pole-piece C, which is in metallic contact centrally with both of the cores. For purposes of description, I will in this case assume that the pole-piece C is polarized "S." This pole-piece contains two cylindrical chambers, each of which is occupied by one of the two rotating magnetic armatures D and D'. Each rotating magnet passes through openings in the end plates or bars, A A', and they are therefore centrally polarized "N" within the pole-piece C. A magnetic pole-piece containing two cylindrical chambers which present similar interior fields of force, as devised by me, is obviously susceptible of varied use in machines of this class.

The rotary magnetic armatures, or magnets which serve as armatures, are composed of a central shaft, $b$, and a series of longitudinal conducting-bars, $c$, insulated from the shaft and from each other, as described in my prior application for Letters Patent hereinbefore referred to. The shaft of the lower rotary magnet, D, is mounted in stationary bracket-boxes $b'$, one on each end plate, and at one end of said shaft is a driving-pulley, $b^2$. The upper rotary magnet-shaft, $b$, is mounted in pendent boxes $b^3$ on hangers which project from the end plates, and said boxes are provided with spindles surrounded by expansive spiral springs within their hangers, so as to cause said upper magnet to be forced downwardly during its rotation. The upper magnet, D', is rotated oppositely to the lower magnet, D, either by means of gearing, as shown at the left hand of the machine in Fig. 1, or by frictional contact of certain insulated conducting-rings on the two magnets, as will be hereinafter indicated. The conducting-bars $c$ of the rotating armature are firmly held in position by means of their angular projecting ends, caps $c'$, which are internally conical, and nuts $c^2$ on the shafts $b$, which are threaded, as shown, said caps being properly insulated from metallic contact with said bars. It will be readily seen that when the rotating armatures are revolved in opposite directions a current will be induced in the bars of each, and also that in the lower armature, with the particular polarization assumed, the direction of said currents will be from the left hand to the right and in the upper armature from the right hand to the left, as indicated by the arrows on said bars.

I will now describe how I have connected the conducting-bars of the lower armature with the conducting-bars of the upper armature in linear series, so that, commencing at the left-hand end of one of the bars of the lower armature, the circuit will be continuous through all the bars of both armatures, and, as here arranged, terminate at the left-hand end of one of the bars of the upper armature, the current in said circuit alternating from one armature to the other in opposite directions until all the bars are included in the continuous circuit.

Figure 7:
Figure 8:
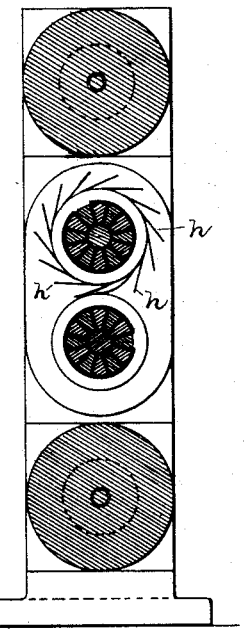
Figure 9:
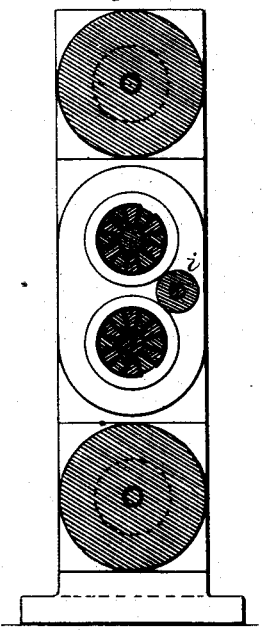

So far as my knowledge extends, I am the first to provide for a continuous electric circuit within a magnetic pole-piece in such a manner that the whole of said circuit which occupies the pole-piece traverses in opposite directions the field of force developed within said pole-piece, and I deem this an important feature in this class of machines. It will be seen that each of the armatures has twelve of the conducting-bars $c$, and that each of said armatures has near each end thereof a series of rings, which serve as connecting-conductors between the two magnets, and it is to be understood that each end of each bar in each magnet is in metallic contact with one of said rings, and that said rings on each armature are each insulated from all of the other bars of that armature and from each other. The four series of conducting-rings are designated as follows: The armature D has the series $d$ and $e$, and armature D' the series $f$ and $g$, and the rings of each series are numbered from 1 to 12 consecutively. As seen in Fig. 1, two of the conducting-bars of each armature are in connection with their respective conducting-rings, and in Fig. 2 one bar of each armature is shown in contact with one of its rings. It will be understood that the ring 1 of series $d$ of the rotary armature D is the negative pole of the machine under the conditions of polarization stated, and that ring 12 of series $g$ is the positive pole, and that each is provided with a suitable roller take-off device or brush, E, as indicated in Figs. 2 and 5. It will be further understood that, with the exception of the ring 1 of series $d$ and ring 12 of series $g$, the conducting-rings of each series are respectively in metallic contact at their peripheries with the peripheries of oppositely-located rings of the opposite series, or, in other words, that the upper armature, D', rests at its rings in rolling contact upon the rings of the lower armature, D, with the exception of the rings referred to as the terminals of the linear circuit. As clearly shown, the conducting-ring 1 of series $d$ is in contact with the upper bar, $c$, of the lower armature, D. The current induced in said bar moves from left to right, and passes therefrom through ring 1 of series $e$ to ring 1 of series $f$, and from this latter through the bar in armature D', which is in contact therewith, and, augmented by the current induced in this second bar, passes to ring 1 of series $g$, and thence to ring 2 of series $d$, and so on throughout all of the bars and rings of both magnets until it reaches the ring 12 of series $g$, from which it is conducted by the brushes, thus dispensing with frictional contact-points, excepting at the terminals of the circuit. The peripheries of the conducting-rings are shown to be plain or flat; but it is obvious that they may be concavo-convex, as shown in Fig. 6, or angular, as shown in Fig. 7, or that said peripheries may be separated if one or the other of said rings be provided with a series of tangential conducting-springs, $h$, as shown in Fig. 8. The conducting-rings for thus electrically connecting two revolving armatures are of value even if the armatures occupy separate pole-pieces of opposite polarity, although when two such armatures were revolved in the same direction the rings would not touch each other, but an intermediate lazy-ring, $i$, as shown in Fig. 9, would be interposed in rolling contact with each pair of coincident armature-rings.

Figure 10:
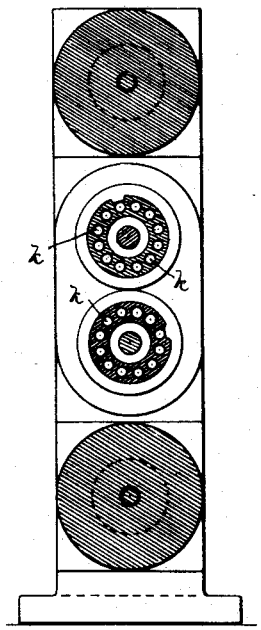

It is to be understood that while the revolving magnets with bars composed of magnetic metal are preferable as armatures in accordance with certain features of my invention, I do not exclude myself from employing revolving armatures having the magnetic core or shaft and bars or conductors composed of copper or other non-magnetic metal having an approved conducting capacity, nor from employing one revolving armature having non-magnetic bars in connection with another revolving armature having magnetic bars, or from employing two revolving armatures each of which contains bars of both varieties of metal, or compound bars composed of bars of both varieties of metal; and it will also be understood that under certain features of my invention I do not limit myself to revolving magnets which embody the series of bars or conductors, it being obvious that solid rotating magnets could be employed, and also that the magnetic cores within the pole-face C may be stationary, and a tubular series of insulated conductors, K, as shown in Fig. 10, and arranged to be revolved around said cores, without departure from certain features of my invention. It is also obvious, if each of the compound rotating magnets embodied a series of bars and were each provided with conducting-rings in contact with and common to all of said bars, and said rings were in electric connection at one end of said magnets, that the current could be taken from one of said magnets, the opposite terminal being at one end of the other magnet, as when the bars are alternately connected in linear series, as shown. It is also obvious that the polar terminals of the machine may be located at opposite ends of either magnetic armature embodying the series of insulated conductors if one of said magnets have one more bar or conductor than the other, because then one end of either one of the bars in the magnet having the extra bar will serve for one terminal and the opposite end of either of the other bars in the same magnet will serve for the other terminal. It is also obvious that the electric circuit in my machine may be subdivided and separate currents taken off by employing rings of smaller diameter than those which serve as conductors from either magnet to the other and applying brushes to said smaller rings.

Figure 11:
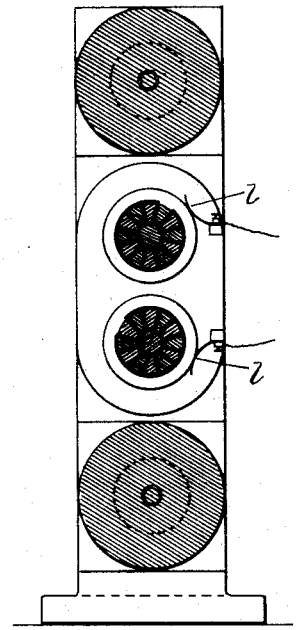

While one of the main points of value now gained by me is the dispensing of the external stationary conductors formerly used by me, it is obvious that certain features of my present invention may be employed advantageously, even with external stationary conductors—as, for instance, in the machine illustrated the conducting-rings may not be in electrical contact at their peripheries, but be electrically connected by means of conducting bow-springs *l*, one arm of each spring being arranged to bear flatly, or by means of a roller to press upon the periphery of an upper ring, the other arm of said spring bearing upon the periphery of the coincident lower ring, as shown in Fig. 11.

Although I make specific claim to certain features in the construction of certain portions of my machine, it is to be understood that said machine may be largely varied in the construction and arrangement of its parts without departure from certain features of my invention.

Having thus described my invention, I claim as new and desire to secure by Letters Patent—

1. A continuous electric circuit occupying parallel conductors within a magnetic pole-piece and traversing the field of force within said pole-piece in opposite directions, substantially as described.

2. The magnetic pole-piece containing two cylindrical chambers presenting similar interior fields of force, substantially as described.

3. The combination, substantially as hereinbefore described, of a pair of electrically-connected and oppositely-revolving armatures, and a pole-piece chambered for the reception of said armatures.

4. The combination, substantially as hereinbefore described, of a pair of electrically-connected and oppositely-revolving magnets operating as armatures, and a pole-piece chambered for the reception of said magnets.

5. The combination, substantially as hereinbefore described, of two armatures rotating in opposite directions in a magnetic field of force, and rings on each armature which are in metallic contact with their respective armatures for enabling a current induced in one armature to pass to the other.

6. The combination, substantially as hereinbefore described, of the connected electro-magnets having the chambered pole-piece, the two armatures revolving in opposite directions in a field of force within said pole-piece, conducting-rings which electrically connect the armatures, and rings for contact with brushes for taking off the current.

7. The combination, substantially as hereinbefore described, of the oppositely-revolving armatures, each embodying a series of bars or conductors which are electrically connected in linear series, whereby an electric current in any or all of the bars in said armatures traverses one linear circuit to and fro and alternately from one armature to the other.

8. The combination of two oppositely-rotated armatures, each embodying a series of bars or conductors, and a series of conducting-rings, substantially as described, for electrically connecting the bars in one armature with those in the other in linear series.

9. The combination, with a magnetic pole-piece, of two oppositely-revolving magnetic armatures, which are composed of the central magnetic core and insulated conducting-bars, substantially as described.

10. The combination, with a magnetic pole-piece, of two oppositely-revolving magnetic armatures, each having a central magnetic core and both having a series of bars, all or a part of which are composed of magnetic metal, substantially as described.

11. The combination of the two parallel cores, the helices surrounding said cores at each end thereof, the end plates, the pole-piece interposed centrally between said cores, and the magnetic armatures rotating within said pole-piece, substantially as described.

12. The combination, with a magnetic pole-piece, of two rotating armatures within said pole-piece, and gearing which couples them together for causing them to be rotated in opposite directions when power is applied to either armature, substantially as described.

13. The combination of two rotating armatures, one of which is mounted in yielding bearings, substantially as described, whereby one armature is rotated in rolling contact with the other.

14. The rotating armature embodying, in combination, an axis, a series of bars or conductors insulated from each other and from said axis, and an insulated screw-cap at each end of said bars for clamping them in position, substantially as described.

RUDOLF EICKEMEYER.

Witnesses:
WM. H. DOPP,
GEORGE NARR.